US006994555B2

(12) United States Patent
Weiner et al.

(10) Patent No.: US 6,994,555 B2
(45) Date of Patent: Feb. 7, 2006

(54) PLAY CUBE TO AID IN RECOGNIZING AND DEVELOPING VARIOUS EMOTIONAL STATES

(75) Inventors: Andrea Goodman Weiner, New Hope, PA (US); Judith L. Jacobson, Gwynedd Valley, PA (US); Donna Evans Strauss, Doylestown, PA (US); Lisa Pretecrum, Doylestown, PA (US); Tammy Russeck, Doylestown, PA (US)

(73) Assignee: Educcomm LLC, New Hope, PA (US)

( * ) Notice: Subject to any disclaimer, the term of this patent is extended or adjusted under 35 U.S.C. 154(b) by 31 days.

(21) Appl. No.: 10/417,641

(22) Filed: Apr. 17, 2003
(Under 37 CFR 1.47)

(65) Prior Publication Data

US 2004/0106091 A1    Jun. 3, 2004

Related U.S. Application Data

(60) Provisional application No. 60/373,443, filed on Apr. 18, 2002.

(51) Int. Cl.
G09B 19/00    (2006.01)
(52) U.S. Cl. .................... 434/236; 434/311; 446/397
(58) Field of Classification Search ................ 434/157, 434/311, 171, 172, 236, 403, 408; 446/397
See application file for complete search history.

(56) References Cited

U.S. PATENT DOCUMENTS

| 3,225,460 A | * | 12/1965 | Randell et al. ............. 434/236 |
| 3,235,263 A | * | 2/1966 | Smith ......................... 273/156 |
| 3,460,838 A | * | 8/1969 | Greenlee, Jr. ................ 369/68 |
| 3,858,333 A | * | 1/1975 | Kopp .......................... 273/272 |
| 4,407,502 A | * | 10/1983 | Paulos .................... 273/153 S |
| 4,573,927 A |  | 3/1986 | Newman |
| 4,846,687 A | * | 7/1989 | White et al. ................. 434/112 |
| 4,936,780 A | * | 6/1990 | Cogliano ..................... 434/311 |
| 5,152,690 A | * | 10/1992 | Todd ........................... 434/113 |
| 5,215,493 A |  | 6/1993 | Zgrodek et al. |
| 5,848,900 A |  | 12/1998 | Pearson |
| 5,944,530 A |  | 8/1999 | Ho et al. |
| 5,983,538 A | * | 11/1999 | Crowell .................... 40/124.14 |
| 6,084,527 A | * | 7/2000 | Spector ...................... 340/3.1 |
| 6,146,721 A | * | 11/2000 | Freynet ......................... 428/7 |
| 6,149,490 A |  | 11/2000 | Hampton |
| 6,220,864 B1 | * | 4/2001 | Walawender ............... 434/236 |
| 6,353,810 B1 |  | 3/2002 | Petrushin |
| 6,554,616 B1 | * | 4/2003 | Love ........................... 434/157 |
| 2002/0009696 A1 | * | 1/2002 | Lui et al. |

* cited by examiner

*Primary Examiner*—Derris H. Banks
*Assistant Examiner*—Dmitry Suhol
(74) *Attorney, Agent, or Firm*—Wendy W. Koba

(57) ABSTRACT

A play cube comprises a set of at least four pictorial representations of different emotional states (e.g., "happy", "sad", "angry", "proud"), with each state depicted on a different face of the cube. One other face of the cube may included a mirrored surface. The cube is used to assist children in learning and identifying emotional states using various processes: visual (seeing lenticular holographic photos), spatial (drawing facial elements of emotional sates), auditory (recording and hearing their own voices depicting emotional states). One embodiment of the inventive play cube includes an embedded game/song element, where the child can respond to different requests within the game/song by touching the associated (matching) face on the cube.

14 Claims, 2 Drawing Sheets

PLAY CUBE TO AID IN RECOGNIZING AND DEVELOPING VARIOUS EMOTIONAL STATES

CROSS-REFERENCE TO RELATED APPLICATIONS

This application claims the benefit of Provisional Application Ser. No. 60/373,443, filed Apr. 18, 2002.

FIELD OF THE INVENTION

The present invention relates to the field of "emotionally smart" toys and, more particularly, to a play cube that is configured to assist children in recognizing and developing various emotional states.

BACKGROUND OF THE INVENTION

The term "emotional intelligence" was first used in 1990 by Peter Salovey and John Mayer, two psychologists interested in understanding people beyond the well-known metric of one's IQ, or "intelligence quotient". Five years later, this concept was popularized in the book *Emotional Intelligence*, by Daniel Goleman. Goleman defined emotional intelligence as "abilities such as being able to motivate oneself and persist in the face of frustrations; to control impulse and delay gratification, to regulate one's moods, and keep distress from swamping the ability to think, to empathize, and to hope". Simply put, emotional intelligence is the collection of emotional qualities that guide us in how we feel, think and take action in our lives. Emotional intelligence determines how we interact with people and our own self-awareness.

As IQ is to intelligence, as is "EQ" synonymous with emotional intelligence. The most important difference between IQ and EQ is that EQ is less genetically determined. For children, this means that their EQ can be influenced to a greater extent (and, therefore, increased) by their parents or other caregivers, particularly since a child's brain continues to grow, especially between the ages of three and eight. Research in brain physiology has shown that all individuals have components in their brain that comprise both the "emotional brain" and the "thinking brain". Children can learn approaches that trigger the circuits between the emotional and thinking brains to work more effectively. The goal of emotional intelligence is to have these brain components partner together and interact well.

A national study of children compared their emotional well-being in the mid-1970s and at the end of the 1980s. The study found that at the end of the 1980s, children had more worries and were more unhappy, anxious, depressed and ill-tempered than their counterparts in the mid-1970s. This rise in the number of children with emotional problems, accompanied by a breakdown of the children's emotional skills, has been attributed to family instability and violence in both society and the media.

SUMMARY OF THE INVENTION

The above-described emotional intelligence learning needs are addressed by the present invention, which relates to the field of "emotionally smart" toys and, more particularly, to a play cube that is configured to assist children in recognizing and developing various emotional states.

In accordance with the present invention, a play cube has been developed that includes images of children displaying various emotional states on different faces of the cube (e.g., "happy", "sad", "angry", "scared", "proud"). Moreover, one face of the play cube may be formed to include a mirrored surface, allowing the child to mimic the various emotional states found on the other cube faces. In one form of "play" with the cube, a parent (or other caregiver) can show a particular emotional state image and ask the child to "copy" that face by studying his/her reflection in the cube mirror.

As an additional feature, the play cube of the present invention may include a set of removable "blank" faces that the child may clip (or otherwise attach) to the various sides of the base cube. The blank faces are formed of a material upon which a child can write, allowing the child to draw (for example) an emotional state on a blank face, so as to match a pictorial image on the cube. Allowing the child to draw the facial features enables the child to further understand and recognize the emotional states being learned.

A recording device may be included within the cube that allows for the child playing with the cube to make a recording associated with a particular emotional state being displayed and/or studied. A pre-recorded audio clip of some sort (such as, for example, a short song, rhyme, game, catch phrase, etc.) may be included on a device embedded within the cube to further the child's development, the audio clip used to promote an audio definition of an emotion to the proper face on the cube (e.g., asking a question such as "which child looks happy?", "touch the face of the scared child", etc.). In various embodiments, the audio clip and response are interactive, where the pace of the interaction is controlled by the child's developmental level.

Other and further embodiments and advantages of the present invention will become apparent during the course of the following discussion and by reference to the accompanying drawings.

BRIEF DESCRIPTION OF THE DRAWINGS

Referring now to the drawings.

DETAILED DESCRIPTION

It has been found that children who can control their emotions and appropriately express their feelings can respond more empathetically to other children. Children are drawn to other children who are emotionally competent in managing their feelings and who have a positive outlook on life. Indeed, it has been found that children who can control their emotions and appropriately express their feelings can respond more empathetically to other children.

In accordance with the present invention, a play cube has been developed that includes images of children displaying various emotional states, each emotional state (e.g., "happy", "sad", "angry", "scared", "proud") displayed on a different side of the cube. In one embodiment, actual photographs of children (preferably of different nationalities) may be used. Alternatively, cartoon illustrations—or any other type of facial expression drawing—may be used. Preferably, one side of the play cube is formed to include a mirrored surface, allowing the child to mimic the various emotional states found on the other sides of the cube. In one form of "play" with the cube, a parent (or teacher or other caregiver) can show one particular emotional state image, and ask the child to "copy" that face by studying his/her reflection in the mirror. As these games are played over a number of weeks and months, the child will more easily be able to identify the various emotional states and produce his/her own facial expression that is associated with each state.

Figure 1:
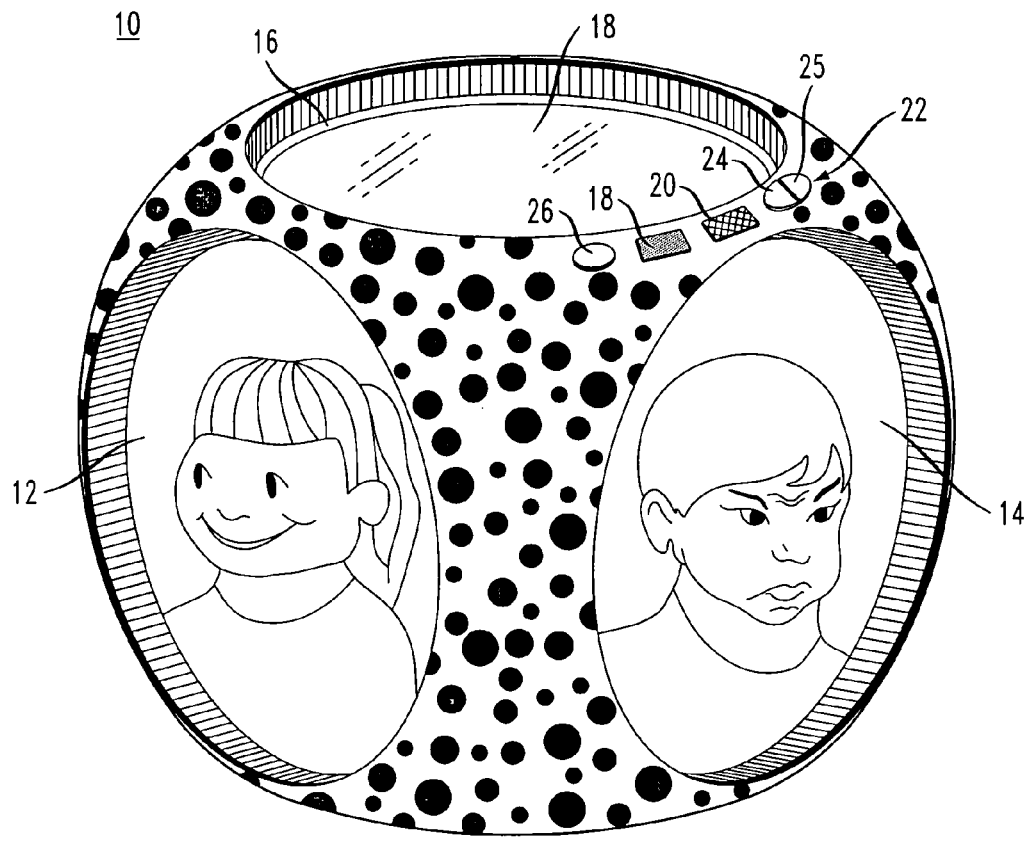
FIG. 1 is an isometric view of an exemplary play cube formed in accordance with the present invention.

FIG. 1 is an isometric view of an exemplary play cube 10 of the present invention, where in this particular example each face includes a pictorial, holograph image of a different child illustrating a different emotional state. Cube 10 may be formed of any appropriate material. For example, one version particularly well-suited for young children may comprise a terry cloth, soft plastic, or foam-based material. A relatively hard, durable plastic may be suitable for use in a version associated for use with slightly older children. In general, any appropriate material may be used to form a play cube in accordance with the teachings of the present invention. The use of a holographic image is also considered to be exemplary and only one embodiment of the type of pictorial representation that may be used. Referring to FIG. 1, a first side 12 of cube 10 contains a photograph of a child displaying the "happy" emotional state, a second side 14 of cube 10 contains a photograph of child display the "angry" emotional state. Top side 16 contains a mirrored surface 18 that a child may used to mimic the various facial expressions/emotional states shown on the other sides of the cube. Top side 16, in this particular embodiment, also includes a microphone 18, speaker 20 and record/play mechanism 22, used to allow a child to record his/her own verbal responses, as well as listen to recorded statements associated with the different emotional states. In the particular embodiment as shown in FIG. 1, mechanism 22 comprises a "record" button 24 and a "play" button 25, both used to active a conventional recording device (not shown) disposed within play cube 10. The child may then use buttons 24 and 25 to record and play back a brief utterance as the cube is used to learn and develop the various emotional states. That is, a teacher/parent may ask a child to say "I'm happy", or "I'm sad", recording these statements so that the child may play them back and mimic (using mirror surface 18) their own pre-recorded statements.

Also visible on the isometric view of FIG. 1 is a "game" button 26, which is distinguishable in some fashion from both "record" button 24 and "play" button 25. The purpose and utilization of game button 26 will be discussed below in association with FIG. 4. In one embodiment, each button may comprise a different color and/or different shape, and each may include a label indicating its function. Indeed, it is to be understood that the physical design and location of each button is not relevant to the purposes of the present invention, as long as a young child is able to distinguish between each feature.

In one embodiment of the present invention, actual pictures of children may be used, since it has been found that children will connect more readily with an actual photo than a cartoon or drawn image. However, in its most general form, any pictorial representation of emotional states (such as cartoon images, drawn images, etc.) may be used. Moreover, depending on the various portrayed emotional states, the play cube of the present invention may be adapted to work with various age ranges. For example, when used with children under the age of three, the play cube may contain sign language representations of the various emotional states, so that non-verbal children can learn and express their emotional states. Another version, particularly suited for older children (e.g., 5–7 years old), may contain images portraying various social situations and peer interactions. Versions designed for older children and adults may include higher-level situational scenes, depicting various emotional states.

As described above and illustrated in FIG. 1, an exemplary version of the play cube of the present invention is particularly well-suited for children in the 3–5 year-old age range, where the ability to recognize and mimic facial expressions, as well as record their own audio responses, is an effective method of learning and recognizing various emotional states. In each version, the play cube of the present invention is intended to promote self-awareness and identification of the various emotional states.

As mentioned above, one embodiment of the present invention may use holographic pictorial images, with a "first" view illustrating a first (perhaps subdued) version of a particular emotion and a "second" view illustrating a second (perhaps enhanced) version of the same emotional state, with the ability of holography to "flash" between views.

Figure 2:
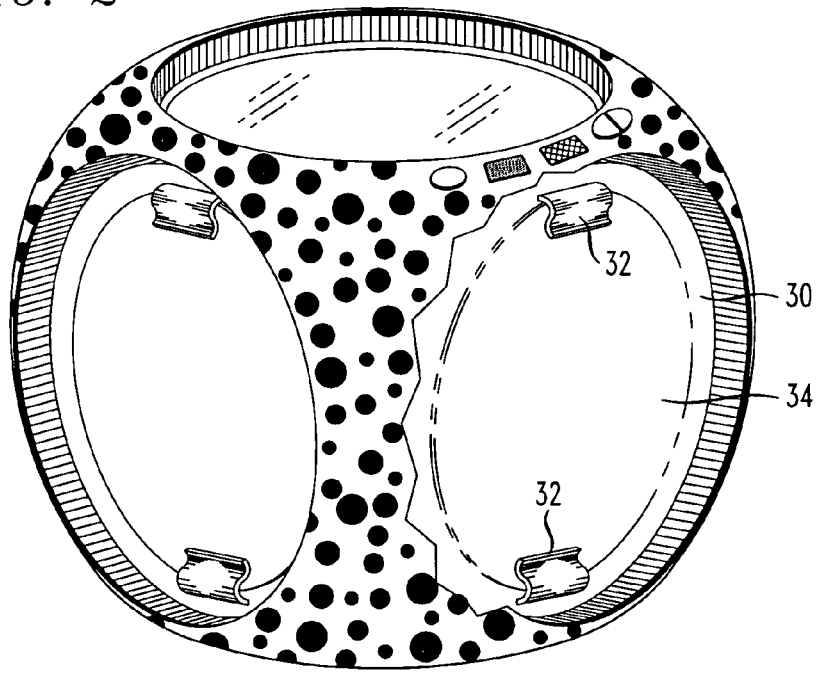
FIG. 2 is a side view of the play cube of FIG. 1, particularly depicting the use of clips to add or remove a detachable blank face from one side of a cube.
Figure 3:
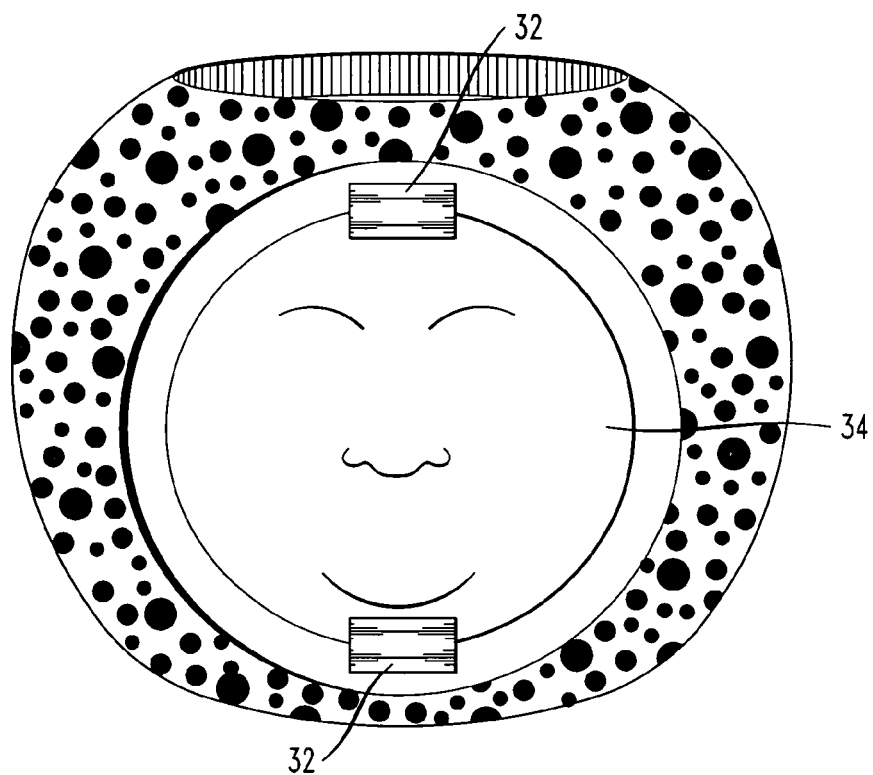
FIG. 3 is a front view of the cube of FIG. 2, illustrating the attachment of a blank face on one side of the play cube.

In one embodiment of the present invention, the play cube may be formed to include an arrangement for removably attaching "blank" faces over the images permanently attached to each side of the cube. FIG. 2 contains a side view of an exemplary play cube 30 of this particular embodiment, utilizing a set of clips 32 and detachable blank faces 34. In the view of FIG. 2, one blank face 34 is shown in phantom as it is placed between clips 32. FIG. 3 is a side view illustrating one particular arrangement of clips 32 that may be used to easily insert a removable blank face 34 on play cube 30. It is to be understood that clips 32 should not overly protrude from the outer surface of play cube 30, so as to present a danger to a child or interrupt with the cube's ability to roll. Alternatively, a loop and hook set (not shown) may be used to removably attach blank faces 34 to play cube 30. The blank faces may be written on may the child, using a erasable marker. The use of the blank faces allows for the parent/teacher to switch between different images to determine a particular set to which their child is more responsive, to prevent "boredom" with looking at the same faces, or for a variety of different reasons.

Figure 4:
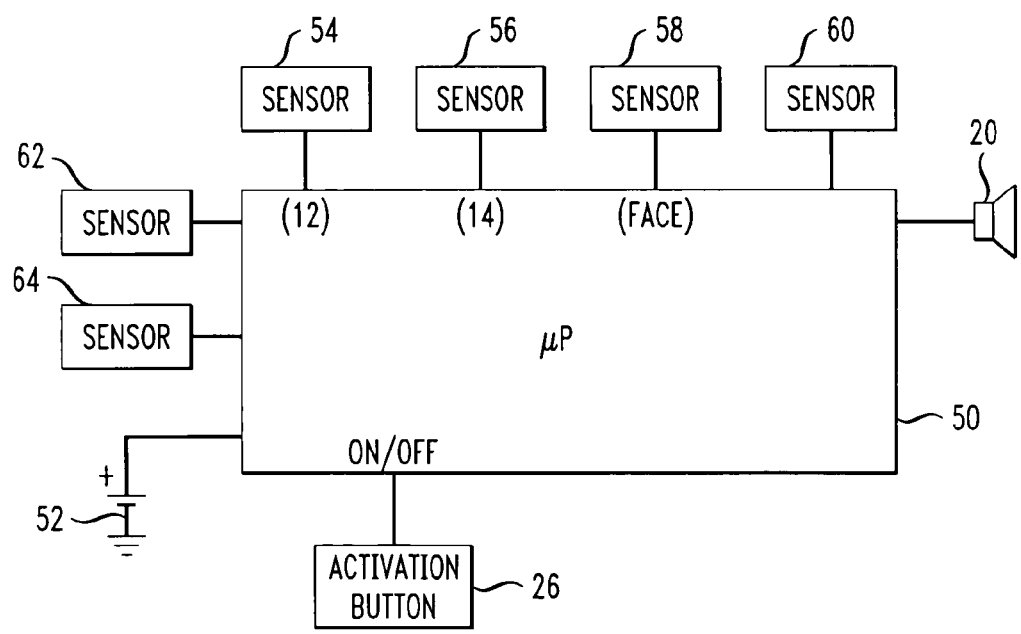
FIG. 4 is a block diagram of an architecture suitable for implementing a pre-recorded game as an embedded feature of the inventive play cube.

As mentioned above, one embodiment of the play cube of the present invention may include a pre-recorded audio clip (for example, a game, song, rhyme, etc.), where the block diagram of FIG. 4 depicts one arrangement of components useful to implement this embodiment. As shown in FIG. 4, a computerized element, such as a microprocessor 50, is pre-programmed to include, for example, a learning song. Microprocessor 50 is powered by a battery source 52 and the output from microprocessor 50 is coupled to the same speaker 20 as is used for the record/playback function discussed above. As will be discussed below, a plurality of sensors 54, 56 58, 60, 62 and 64 (one sensor for each face of the cube, such that there is a one-to-one association between the faces and the sensors). In one embodiment, the plurality of sensors may be capacitively coupled devices that are attached between each face of the cube and an input to microprocessor 50. The "game" activation button 26 is also coupled as an input to microprocessor 50 and is sued to control the initiation of the learning game process.

In one particular example of a learning game associated with the play cube of the present invention, a child presses game activation button 26, which causes microprocessor 50 to being to a play a song, the song describing the various emotional states. In this example, the song will randomly choose a particular emotional state and keep repeating the song phrase associated with the randomly chosen state until the child touches the proper face. When the child touches the proper face, the associated sensor (for example, sensor 56) will return the signal to microprocessor 50, which proceeds to determine if the response is proper/improper and continue accordingly. The game will then continue until the child again presses game button 26 (or the unit "times out" after a predetermined period of time). It is to be understood that various types of audio clips may be used with microprocessor 50, as well as various different languages, and all of these variations are considered to fall within the spirit and scope of the present invention.

As mentioned above, the pace of a game can be controlled to match the developmental level of the child using the play cube. That is, the faster the child is able to locate and match the face on the cube with the face in the game, the faster the game will proceed. The slower the player, the slower the pace of the game. In particular, microprocessor 50 can be configured to count the number of "wrong" guesses the child makes (i.e., count the number of wrong sensors that are touched) before the child touches the proper response face. For example, if the child finds and presses the correct face with only one or two repetitions of the word (the "word" describing the emotional state), then the game pace moves to a higher level. If the child needs three or four repetitions of the word, a more moderate pace will be used. The ability to control the pace of the game allows for younger children to succeed, while also providing a learning toy that is more challenging for older children, and in all cases encourages the child to continue to work with the to and strive for higher levels of performance.

In general, parents, teachers and children will explore all sides of the play cube by holding, rolling and rotating the cube. The depicted (perhaps holographic) emotional states allow for a child to understand his/her own emotional states, and replicate these states on the mirror surface of the cube. The ability to include removable, blank faces allows for older children to draw these states and make a deeper connection to their own emotions. The inclusion of one or more audio clips (in terms of, for example, one or more learning games, songs, rhymes, catch phrases, etc.), as well as the inclusion of a recording ability, adds further tactile and aural sense affirmations of these emotional states.

While the play cube has been discussed above in both general terms and specific embodiments, it is to be understood that the inventive nature of the cube is not limited to any specific embodiment, but rather is defined by the spirit and scope of the claims as appended hereto.

What is claimed is:

1. An instructional, educational play cube for assisting in a child's learning and development of a plurality of different emotional states, the play cube formed as comprising a set of six different sides, said play cube comprising a plurality of different faces depicted on separate ones of said different sides, each face illustrating a different emotional state, wherein the plurality of different faces are formed on at most five sides of said cube;

a mirrored surface formed on at least one of the remaining sides of said play cube and used to assist a child in mimicking the different emotional states associated with the at most five different faces by studying his/her reflection therein; and a record/playback unit embedded within said cube and controlled by a record mechanism and a playback mechanism disposed on the outer surface of said cube, said record/playback unit further comprising a microphone and a speaker disposed on the outer surface of said cube.

2. An instructional, educational play cube as defined in claim 1 wherein the plurality of faces comprise holographic images.

3. An instructional, educational play cube as defined in claim 2 wherein each holographic image includes a first depiction of a particular emotional state and a second, different depiction of the same particular emotional state.

4. An instructional, educational play cube as defined in claim 3 wherein the first depiction is relatively subdued and the second depiction is relatively exaggerated.

5. An instructional, educational play cube as defined in claim 1 wherein the plurality of different emotional states, each depicted on a different cube side, comprise "happy", "sad", "proud", "angry", and "scared".

6. An instructional, educational play cube as defined in claim 1 wherein the plurality of different emotional states are depicted in sign language form on the different cube sides.

7. An instructional, educational play cube as defined in claim 1 wherein the record mechanism comprises a properly-sized record button and the playback mechanism comprises a properly-sized playback button, wherein different physical characteristics are used to distinguish between the record button and the playback button.

8. An instructional, educational play cube as defined in claim 1 wherein the play cube further comprises a game microprocessor embedded within said cube, a game activation mechanism disposed on the outer surface of said cube, and a plurality of sensors coupled between each side of said cube and said game processor, the plurality of sensors being touch-responsive and used to provide input signals to said microprocessor as a game is played with said cube.

9. An instructional, educational play cube as defined in claim 8 wherein the microprocessor stores audio clips in at least one language.

10. An instructional educational play cube as defined in claim 9 wherein the microprocessor stores audio clips in multiple languages.

11. An instructional, educational play cube as defined in claim 1 wherein the cube includes means for attaching at least one blank face onto a side of said cube such that a child could draw a given emotional expression on the attached face.

12. An instructional, educational play cube as defined in claim 11 wherein said blank face comprises a material that may be written on with an erasable marker.

13. An instructional, educational play cube as defined in claim 11 wherein the cube comprises at least an opposing pair of clips disposed on a cube side, to removably attach a blank face to said cube.

14. An instructional, educational play cube as defined in claim 11 wherein the cube comprises a hook and loop attachment arrangement to removably attach a blank face to said cube.

* * * * *